US012645795B2

(12) United States Patent
Gabay et al.

(10) Patent No.: US 12,645,795 B2
(45) Date of Patent: Jun. 2, 2026

(54) TECHNIQUES FOR AGENTLESS VULNERABILITY INSPECTION IN ON-PREMISES COMPUTING ENVIRONMENTS

(71) Applicant: Wiz, Inc., New York, NY (US)

(72) Inventors: Elad Gabay, Tel Aviv (IL); Liron Levin, Kfar Saba (IL); Michael Kletselman, Tel Aviv (IL); Isaac Schnitzer, Raanana (IL); Eran Yanay, Tel Aviv (IL); Roy Reznik, Tel Aviv (IL)

(73) Assignee: Wiz, Inc., New York, NY (US)

( * ) Notice: Subject to any disclaimer, the term of this patent is extended or adjusted under 35 U.S.C. 154(b) by 78 days.

(21) Appl. No.: 18/312,739

(22) Filed: May 5, 2023

(65) Prior Publication Data

US 2024/0330456 A1    Oct. 3, 2024

Related U.S. Application Data

(60) Provisional application No. 63/492,884, filed on Mar. 29, 2023.

(51) Int. Cl.
*G06F 21/56* (2013.01)
*G06F 21/53* (2013.01)
*G06F 21/54* (2013.01)

(52) U.S. Cl.
CPC ............ *G06F 21/564* (2013.01); *G06F 21/53* (2013.01); *G06F 21/54* (2013.01)

(58) Field of Classification Search
CPC ........ G06F 21/564; G06F 21/53; G06F 21/54; G06F 21/577; H04L 63/1433
See application file for complete search history.

(56) References Cited

U.S. PATENT DOCUMENTS

| | | | |
|---|---|---|---|
| 9,591,028 B2 | 3/2017 | Babb et al. | |
| 11,012,441 B2 | 5/2021 | Totale et al. | |
| 11,601,400 B2 | 3/2023 | Yehudai et al. | |
| 2009/0240808 A1* | 9/2009 | Chen | H04L 47/70 |
| | | | 709/226 |
| 2012/0158975 A1* | 6/2012 | Hogoboom | H04L 69/22 |
| | | | 709/228 |
| 2015/0286535 A1* | 10/2015 | Kushwah | G06F 11/1451 |
| | | | 707/646 |
| 2016/0224794 A1* | 8/2016 | Roberts | G06F 21/562 |
| 2017/0012844 A1* | 1/2017 | Ellison | H04L 69/162 |
| 2017/0111384 A1* | 4/2017 | Loureiro | H04L 63/1433 |
| 2020/0244692 A1* | 7/2020 | Shua | H04L 63/1416 |
| 2021/0326046 A1* | 10/2021 | Handa | G06F 3/0634 |

(Continued)

*Primary Examiner* — Trong H Nguyen
(74) *Attorney, Agent, or Firm* — M&B IP Analysts, LLC

(57) ABSTRACT

A system and method for inspecting a resource in an on-premises environment for a cybersecurity threat are disclosed. According to an embodiment, the method includes initiating a network communication between an on-premises environment and an inspection environment; scanning the on-premises environment for a workload, the workload including a disk; generating an inspectable disk based on the disk; providing access to an inspector deployed in the inspection environment to inspect the inspectable disk for a cybersecurity object; and releasing a resource allocated to the inspectable disk in response to detecting that inspection of the inspectable disk is complete.

19 Claims, 3 Drawing Sheets

(56) References Cited

U.S. PATENT DOCUMENTS

| | | | |
|---|---|---|---|
| 2021/0377287 A1* | 12/2021 | Shua | G06F 9/45558 |
| 2022/0210202 A1* | 6/2022 | Crabtree | G06F 16/2477 |
| 2024/0022590 A1* | 1/2024 | Douglas | G06F 21/577 |
| 2025/0298897 A1* | 9/2025 | Mishra | G06F 11/1464 |

* cited by examiner

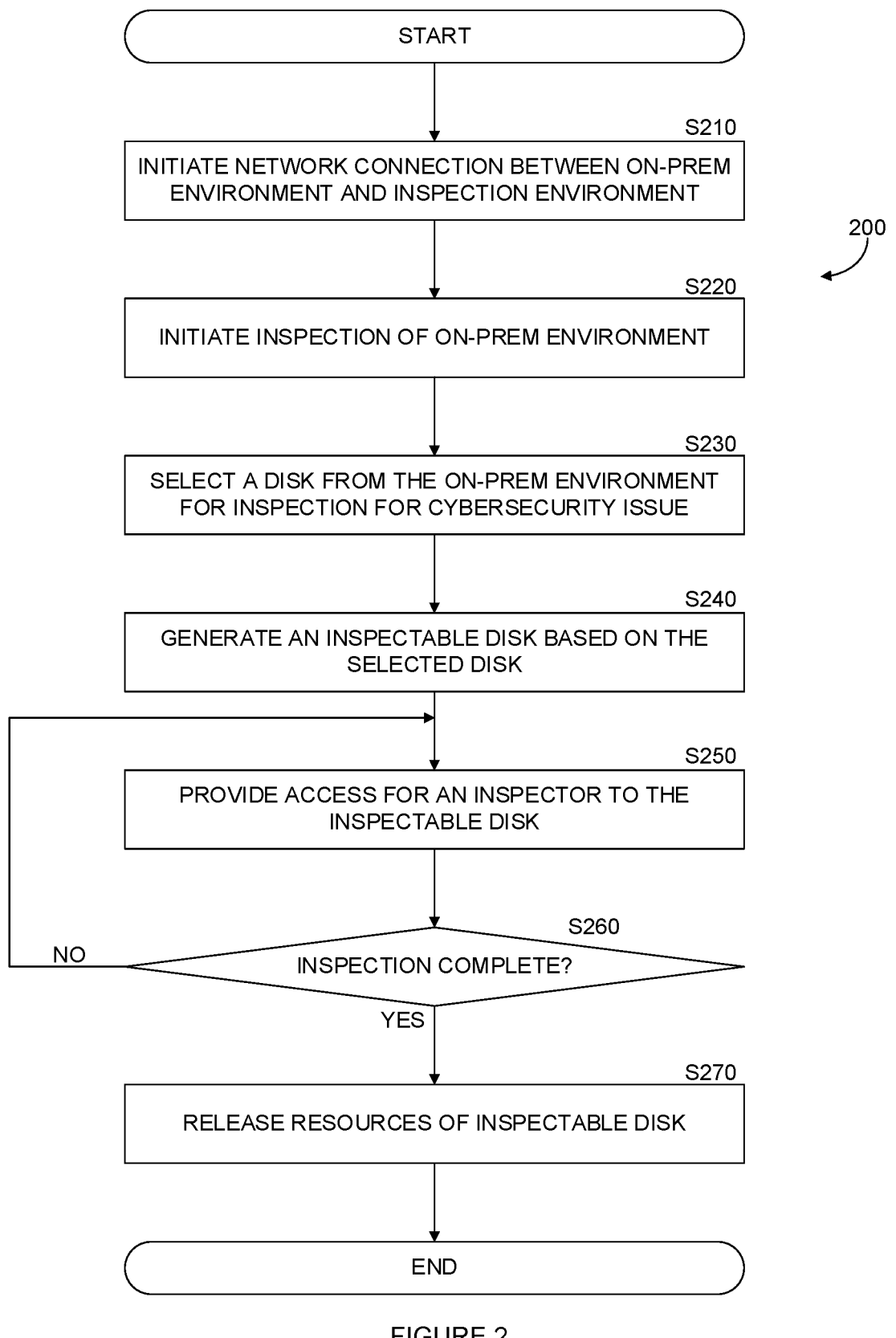

START

S210

INITIATE NETWORK CONNECTION BETWEEN ON-PREM ENVIRONMENT AND INSPECTION ENVIRONMENT

200

S220

INITIATE INSPECTION OF ON-PREM ENVIRONMENT

S230

SELECT A DISK FROM THE ON-PREM ENVIRONMENT FOR INSPECTION FOR CYBERSECURITY ISSUE

S240

GENERATE AN INSPECTABLE DISK BASED ON THE SELECTED DISK

S250

PROVIDE ACCESS FOR AN INSPECTOR TO THE INSPECTABLE DISK

S260

INSPECTION COMPLETE?

NO

YES

S270

RELEASE RESOURCES OF INSPECTABLE DISK

END

FIGURE 2

TECHNIQUES FOR AGENTLESS VULNERABILITY INSPECTION IN ON-PREMISES COMPUTING ENVIRONMENTS

CROSS-REFERENCE TO RELATED APPLICATIONS

This application claims the benefit of U.S. Provisional Patent Application No. 63/492,884 filed on Mar. 29, 2023, the contents of which are hereby incorporated by reference.

TECHNICAL FIELD

The present disclosure relates generally to cybersecurity, and specifically techniques for agentless detection of cyber-security issues in on-premises environments.

BACKGROUND

Cybersecurity is an area of computer science and engineering which is devoted to the detection, protection, and mitigation, against digital assets and computerized systems. With the convenience of interconnected solutions, comes the threat of attack on infrastructure and the like, which utilizes computer networks.

Cybersecurity monitoring solutions may generally be categorized into agent-based solutions and agentless solutions. Each has distinct advantages and disadvantages Agentless solutions which scan for cybersecurity issues are often not exposed to run time data, relying instead on scanning of snapshots and the like. Agent based scanning solutions, on the other hand, can have wide access to a machine, including run time data, however where an agent is deployed, for example, as a service on a machine, such a service requires compute resources from the scanned machine, and from each scanned machine on which an agent is installed. Over an entire computing environment, this is a heavy price to pay, as even a small utilization of a processor of every single machine in a computing environment quickly adds up to significant compute resources which are often expensive to devote.

Furthermore, cybersecurity monitoring solutions, such as scanners are often tailored to fit a specific environment, such as Amazon® Web Services, Microsoft® Azure, and the like. On the other hand, users often deploy multiple environments using multiple types of infrastructure, requiring them to utilize multiple different types of monitoring solutions, all of which require constant maintenance as new cybersecurity threats are discovered daily.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method for inspecting a resource in an on-premises environment for a cybersecurity threat. The method also includes initiating a network communication between an on-premises environment and an inspection environment; scanning the on-premises environment for a workload, the workload including a disk; generating an inspectable disk based on the disk; providing access to an inspector deployed in the inspection environment to inspect the inspectable disk for a cybersecurity object; and releasing a resource allocated to the inspectable disk in response to detecting that inspection of the inspectable disk is complete. Other embodiments of this aspect include corresponding computer systems, apparatus, and computer programs recorded on one or more computer storage devices, each configured to perform the actions of the methods.

Implementations may include one or more of the following features. The method may include: transferring the inspectable disk to the inspection environment. The method may include: transferring a portion of the inspectable disk to the inspection environment as a data stream. The method may include: determining that the portion of the inspectable disk potentially includes a cybersecurity object. Determining that the portion of the inspectable disk potentially includes the cybersecurity object, which includes: determining that the inspectable disk includes an operating system of a first type; detecting a file of a predetermined file type based on the operating system of the first type; and transferring the file of the predetermined file type as part of the portion of the inspectable disk. The method may include: allocating a predetermined fixed bandwidth to the initiated network communication. The method may include: terminating the network communication in response to detecting that inspection of the inspectable disk is complete. The principal is configured to be assumed by the inspector. The method may include: mounting the inspectable disk in the on-premises environment. Implementations of the described techniques may include hardware, a method or process, or computer software on a computer-accessible medium.

One general aspect includes a non-transitory computer readable medium having stored thereon instructions for causing a processing circuitry to execute a process. The non-transitory computer readable medium also includes initiating a network communication between an on-premises environment and an inspection environment; scanning the on-premises environment for a workload, the workload including a disk; generating an inspectable disk based on the disk; providing access to an inspector deployed in the inspection environment to inspect the inspectable disk for a cybersecurity object; and releasing a resource allocated to the inspectable disk in response to detecting that inspection of the inspectable disk is complete. Other embodiments of this aspect include corresponding computer systems, apparatus, and computer programs recorded on one or more computer storage devices, each configured to perform the actions of the methods.

One general aspect includes a system for inspecting a resource in an on-premises environment for a cybersecurity threat. The system also includes a processing circuitry. The system also includes a memory, the memory containing instructions that, when executed by the processing circuitry, configure the system to: initiate a network communication between an on-premises environment and an inspection environment; scan the on-premises environment for a workload, the workload including a disk; generate an inspectable disk based on the disk; provide access to an inspector deployed in the inspection environment to inspect the inspectable disk for a cybersecurity object; and release a resource allocated to the inspectable disk in response to detecting that inspection of the inspectable disk is complete. Other embodiments of this aspect include corresponding computer systems, apparatus, and computer programs recorded on one or more computer storage devices, each configured to perform the actions of the methods.

Implementations may include one or more of the following features. The system where the memory includes further instructions which when executed by the processing circuitry further configure the system to: transfer the inspectable disk to the inspection environment. The memory includes further instructions which when executed by the processing circuitry further configure the system to: transfer a portion of the inspectable disk to the inspection environment as a data stream. The memory includes further instructions which when executed by the processing circuitry further configure the system to: determine that the portion of the inspectable disk potentially includes a cybersecurity object. The memory includes further instructions which when executed by the processing circuitry further configure the system to determine that the portion of the inspectable disk potentially includes the cybersecurity object by: determining that the inspectable disk includes an operating system of a first type; detecting a file of a predetermined file type based on the operating system of the first type; and transferring the file of the predetermined file type as part of the portion of the inspectable disk. The memory includes further instructions which when executed by the processing circuitry further configure the system to: allocate a predetermined fixed bandwidth to the initiated network communication. The memory includes further instructions which when executed by the processing circuitry further configure the system to: terminate the network communication in response to detecting that inspection of the inspectable disk is complete. The memory includes further instructions which when executed by the processing circuitry further configure the system to: provide access for a principal of the on-premises environment to the inspectable disk, where the principal is configured to be assumed by the inspector. The memory includes further instructions which when executed by the processing circuitry further configure the system to: mount the inspectable disk in the on-premises environment. Implementations of the described techniques may include hardware, a method or process, or computer software on a computer-accessible medium.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

FIG. 2 is an example flowchart of a method for providing agentless inspection of a cybersecurity issue for an on-premises computing environment, implemented in accordance with an embodiment.

DETAILED DESCRIPTION

Figure 1:
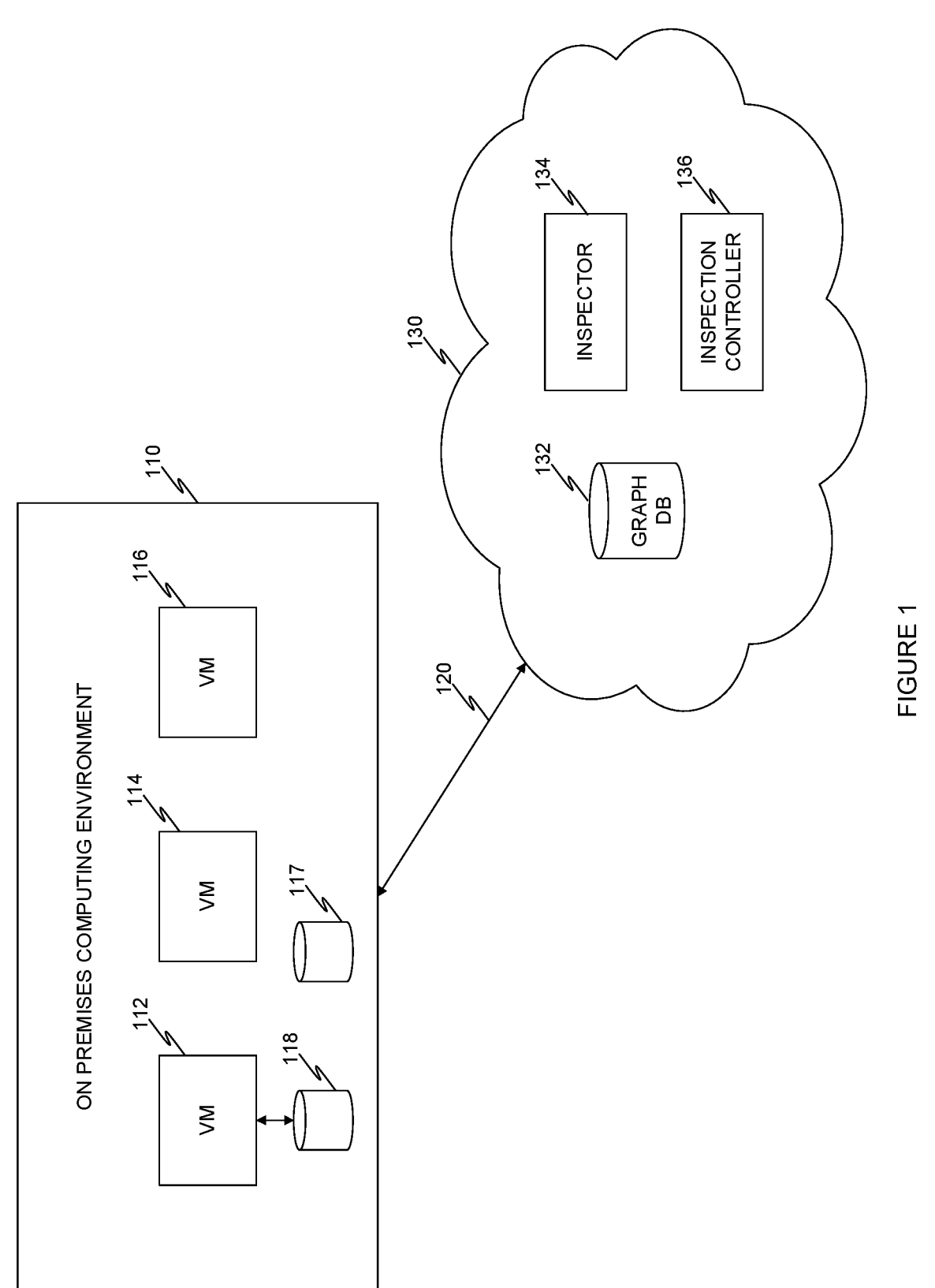
FIG. 1 is an example schematic illustration of network diagram of an inspection environment inspecting an on-premises computing environment for cybersecurity issues, implemented according to an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for detecting cybersecurity objects, cybersecurity threats, and the like, in an on-premises computing environment. In some embodiments, the on-premises (on-prem) computing environment is communicatively connected to an inspection environment which is configured to inspect the on-prem environment for cybersecurity objects.

For example, in an embodiment, the on-prem computing environment, the inspection environment, and the like, periodically initiates a network communication, also referred to as a network channel, network pipeline, etc., between the on-prem environment and the inspection environment. In some embodiments, the network communication includes a predetermined amount of network bandwidth. Network discovery is performed on the on-prem environment, for example by an inspection controller of the inspection environment, in an embodiment. A disk, such as a disk associated with a virtual machine deployed in the on-prem environment, is detected by the network discovery.

In an embodiment, an inspectable disk is generated based off of the disk of the virtual machine. Access to the inspectable disk is provided to the inspection environment. For example, in some embodiments, accessing the inspectable disk includes configuring a principal of the on-prem environment to be assumed by a resource, a principal, and the like, of the inspection environment.

In certain embodiments, the inspectable disk is transmitted, transferred, and the like, over the initiated network communication to the inspection environment. In some embodiments, a portion of the inspectable disk is transferred to the inspection environment. This is advantageous as it reduces requirements from the on-prem environment to allocate resources to cybersecurity inspection, where such resources are often ineffective.

For example, it is not advantageous to have dedicated resources (e.g., computers, processors, storage, etc.) for cybersecurity inspection, as they are not constantly active. However, regardless of activity, such physical resources take up physical space, require maintenance, and otherwise incur cost without providing benefit. Furthermore, it is not advantageous for the on-prem environment to devote a portion of its resources each time for cybersecurity inspection, as this diverts such resources from performing other tasks for which they are routinely required.

It is therefore advantageous to predetermine a portion of the inspectable disk which potentially includes cybersecurity objects, transfer such a portion to the inspection environment, and inspect the portion for cybersecurity objects, threats, and the like.

FIG. 1 is an example schematic illustration of network diagram of an inspection environment inspecting an on-premises computing environment for cybersecurity issues, implemented according to an embodiment.

In an embodiment, an on-premises computing environment 110, also referred to herein as an on-prem environment, is a networked computing environment which includes physical machines (i.e., bare metal), virtual machines deployed on the physical machines, software applications, and the like, all on a network having a single physical location, which is the premises. For example, the on-prem environment 110 includes, in an embodiment, a plurality of virtual machines (VMs), such as first VM 112, second VM 114, and third VM 116.

In an embodiment, the on-prem environment 110 incudes a virtualization platform, such as VMWare® vSphere™, on which a hypervisor, such as ESXi™ is deployed. In an embodiment, the hypervisor is a type one hypervisor, which includes operating system elements, such as a kernel, allowing it to run directly on a bare metal server. A type one hypervisor does not require an operating system to run the hypervisor.

The hypervisor of the on-prem environment 110 provisions resources from the on-prem environment 110 to the plurality of VMs. For example, the hypervisor provisions processor resources, memory resources, storage resources, and the like.

The on-prem environment 110 is connected via a network link 120 to an inspection environment 130. In an embodiment, the network link 120 includes a transport layer, an Internet layer, a link layer, a combination thereof, and the like. For example, in an embodiment the network link 120 includes a TCP/IP protocol link between the on-prem environment 110 and the inspection environment 130.

In an embodiment, the inspection environment 130 is a cloud computing environment, such as a virtual private cloud (VPC) deployed on a cloud computing infrastructure. A cloud computing infrastructure is, for example, Amazon® Web Services (AWS), Microsoft® Azure, Google® Cloud Platform (GCP), and the like. In an embodiment, the inspection environment 130 is configured to provide agentless inspection for cybersecurity issues.

In certain embodiments, the inspection environment 130 includes a plurality of inspectors, such as inspector 134. In an embodiment, an inspector 134 is configured to inspect an inspectable disk for a cybersecurity object. In some embodiments, a cybersecurity object is a secret, a password, a hash, a certificate, an application identifier, an operating system identifier, a file, a folder, a filesystem, a misconfiguration, a vulnerability, an exposure, a combination thereof, and the like.

In an embodiment, an inspector 134 is implemented as a node of a software container cluster, such as a cluster deployed on a Kubernetes® container engine. In certain embodiments, a first inspector is configured to inspect for a first cybersecurity object, and a second inspector is configured to inspect for a second cybersecurity object, which is not the first cybersecurity object.

The inspection environment 130 further includes, in an embodiment, an inspection controller 136. In certain embodiments, the inspection controller 136 is configured to receive a connection request from an on-prem environment 110, in order to establish the network link 120. For example, the inspection controller 136 is configured, in an embodiment, to listen on a predetermined port for a request to initiate a network link. In certain embodiments the network link 120 includes a bandwidth, which is the amount of data which is transferable between the on-prem computing environment 110 and the inspection environment 130 over the network link 120, for a predefined window of time.

In certain embodiment, the inspection controller 136 is further configured to select a storage resource from the on-prem environment 110 for inspection. A storage resource is, in an embodiment, a disk 118 allocated to a virtual machine, such as VM 112.

In some embodiments, the inspection controller 136 is configured to generate an inspectable disk 117, based on the disk 118. In an embodiment, an inspectable disk 117 is generated by initiating a duplication, initiating a cloning, initiating a snapshot, and the like, of the disk 118. In an embodiment, the inspection controller 136 is configured to assume a role of a principal account in the on-prem computing environment 110. A principal account is, according to an embodiment, a user account, a service account, and the like. A principal is an entity, in an embodiment, which is authorized to initiate actions in a computing environment. In certain embodiments, the inspection controller 136 is configured to generate the inspectable disk 117 utilizing the assumed role in the on-prem computing environment 110.

In some embodiments, the inspection environment 130 further includes a security graph stored on a graph database 132. In an embodiment, the security graph includes a representation of the on-prem environment 110. For example, components of the on-prem environment are represented, in an embodiment, as nodes in the security graph. A component of an on-prem environment 110 is, for example, a virtual machine, a bare metal server, a user account, a service account, a disk, an application, an operating system, a cybersecurity issue, an endpoint, and the like.

In certain embodiments, representing an on-prem computing environment 110 on a security graph allows to apply rules, policies, controls, and the like, on the on-prem computing environment 110, and detect violations of the rules, policies, controls, and the like, for example by querying the security graph. In some embodiments, a hybrid computing environment includes an on-prem environment and a cloud computing environment, communicatively coupled with each other. In such embodiments, representing both environments utilizing a single representation scheme of a security graph allows, for example, to apply policies, rules, controls, and the like across all the computing environments, in a manner which is consistent and equal.

By configuring an inspection controller 136 to initiate inspection on components of the on-prem computing environment 110, such as the VM 112, the on-prem computing environment 110 is inspected for cybersecurity issues in an agentless method. This reduces the amount of processing required from the on-prem computing environment 110. This is possible, for example, due to not requiring an agent service, application, program, and the like, to be installed on each component of the on-prem computing environment 110.

In certain embodiments, the inspection controller 136 is further configured to determine an amount of bandwidth to allocate to the network link 120. In some embodiments, the allocated bandwidth is determined based on a number of components being inspected, a number of components being inspected simultaneously, a number of inspectors, a combination thereof, and the like. In some embodiments, the inspection controller 136 is configured to initiate inspection based on an identifier of a component (e.g., a name, IP address, and the like of a virtual machine). The inspection controller 136 is further configured, in such embodiments, to select a disk of the component for inspection. This is useful for example, in order to inspect a disk which includes software libraries, binaries, and the like, while excluding a disk which includes only data thereon.

FIG. 2 is an example flowchart of a method for providing agentless inspection of a cybersecurity issue for an on-premises computing environment, implemented in accordance with an embodiment. An agentless inspection is desirable as it consumes less processing and memory resources from a computing environment than an agent based solution, which are computationally expensive. An agentless inspection allows devoting predetermined resources in terms of processing, memory, and network bandwidth, and inspecting components of an on-prem computing environment in a serial manner.

At S210, a network connection is initiated. In an embodiment the network connection includes a network link between an on-premises (on-prem) computing environment and an inspection environment. In an embodiment, the network link includes a transport layer, an Internet layer, a link layer, a combination thereof, and the like. For example, in an embodiment the network link includes a TCP/IP protocol link between the on-prem environment and the inspection environment.

In certain embodiments, a connection request is received from an on-prem environment in order to initiate the network link. In some embodiments, a predetermined port is listened to, for example by a serverless function, for a request to initiate a network link. In certain embodiments the network link includes a bandwidth, which is the amount of data which is transferable between the on-prem computing environment and the inspection environment over the network link, for a predefined window of time.

In an embodiment, the network connection is initiated between a serverless function deployed in the on-prem environment, and a serverless function deployed in an inspection environment.

At S220, an inspection of the on-prem environment is initiated. In an embodiment, initiating an inspection includes inspecting a resource of the on-prem environment for a cybersecurity object. In certain embodiments, a cybersecurity object is a secret, a password, a hash, a certificate, an application identifier, an operating system identifier, a file, a folder, a filesystem, a misconfiguration, a vulnerability, an exposure, a combination thereof, and the like.

In some embodiments, initiating inspection of an on-prem environment includes sending an instruction to the on-prem environment which when executed, for example by a serverless function deployed in the on-prem environment, initiates an inspection, a scan, a detection, and the like, of cybersecurity objects.

At S230, a disk is selected for inspection. In an embodiment, a network scan is initiated on the on-prem environment to detect workloads, such as virtual machines, bare metal machines, software containers, serverless function, and the like. In an embodiment, each workload is associated with a hardware resource which provides a form of storage, such as a memory, a bucket, a storage, a disk, and the like. In certain embodiments, a disk is selected from a list of workloads, a list of disks, a list of disks associated with workloads, and the like, which is generated based on a network scan of the on-prem environment.

For example, in an embodiment, a network scan is initiated which detects a workload having a unique network address (e.g., an IP address). In an embodiment, the workload is accessed utilizing the unique network address to determine if the workload includes a disk which can be accessed and inspected for cybersecurity objects. In some embodiments, a disk is a primary disk, a secondary disk, and the like. For example, in an embodiment, a primary disk includes an operating system, a system file, an application, binaries, software libraries, and the like. In certain embodiments, a secondary disk is a data disk. A data disk, according to an embodiment, does not contain an operating system, a system file, and the like.

In certain embodiments, a disk selected for inspection is a primary disk. In some embodiments, it is advantageous to inspect only primary disks for cybersecurity objects. This is advantageous where cybersecurity objects occur on primary disks more often than on secondary disks.

At S240, an inspectable disk is generated. In an embodiment, an inspectable disk is generated based on a disk selected for inspection. In some embodiments, an inspectable disk is generated by initiating a clone, a copy, a snapshot, a combination thereof, and the like, of the selected disk. In some embodiments, an inspectable disk includes a permission which permits access to a predetermined principal, such as a user account, a service account, a role, a combination thereof, and the like.

In certain embodiments, a selected disk is encrypted with a first encryption key. In some embodiments, an inspectable disk is generated by re-encrypting a disk with a second encryption key, and providing access to the second encryption key to the predetermined principal. In certain embodiments, the predetermined principal does not have access to the first encryption key.

In an embodiment, an inspectable disk is advantageous for detection of cybersecurity objects in lieu of detection of cybersecurity objects on a selected disk. A selected disk is part of a computing environment which provides, for example, services and the like to other workloads, principals, etc. in the on-prem environment. Inspecting such a disk for cybersecurity objects requires access bandwidth devoted to such an inspection, during which the disk becomes practically inoperable for its purpose. It is therefore advantageous to generate an inspectable disk, and inspect the inspectable disk for cybersecurity objects, for example in order to determine cybersecurity threats, such as malware, misconfigurations, vulnerabilities, exposures, weak passwords, exposed certificates, and the like.

At S250, access is provided to the inspectable disk. In certain embodiments, the on-prem environment includes a principal, such as service account, a role, and the like, which can be assumed by another principal, a resource, and the like. For example, in an embodiment, access to the inspectable disk is provided, e.g., by generating a permission, to a service account deployed in the on-prem environment.

In some embodiments, the service account is assumed by an inspector, wherein the inspector is deployed in an inspection environment. This allows the on-prem environment to conserve computer resources, for example by not having to provision hardware resources, such as processors, memory, storage, and the like, in order to deploy an inspector.

In certain embodiments, the inspector communicates with the on-prem environment over the network connection, such as initiated at S210. In some embodiments, access is provided to a plurality of inspectors, each inspector configured to inspect the inspectable disk for a unique cybersecurity object. For example, in an embodiment, a first inspector is configured to inspect the inspectable disk for a misconfiguration, a second inspector is configured to inspect the inspectable disk for a malware code object, etc.

In some embodiments, access to the inspectable disk is provided simultaneously to a plurality of inspectors. In certain embodiments, access to the inspectable disk is provided to a plurality of inspectors sequentially, such that inspection of a first inspector is completed prior to inspection of a second inspector beginning.

In some embodiments, a predetermined amount of network bandwidth is provisioned, for example by a serverless function deployed in the on-prem environment, which is utilized for the communication between the on-prem environment and the inspection environment. In certain embodiments, the inspectable disk is transmitted, for example as a data stream, over the network connection utilizing the provisioned network bandwidth to the inspection environment, where the inspectable disk is mounted and inspected by an inspector.

In an embodiment, a portion of the inspectable disk is sent to the inspection environment. For example, in certain embodiments, a portion of the inspectable disk includes a predetermined file, a predetermined file type, a combination thereof, and the like. In some embodiments, the predetermined file, the predetermined file type, and the like, is selected based on the file system of the disk. For example, a disk having a first operating system (e.g., Microsoft® Windows®) installed thereon has a different file system than a disk having a second operating system (e.g., Linux™) installed thereon.

In some embodiments, a portion of the inspectable disk is sent to the inspection environment in response to determining that the portion of the inspectable disk potentially includes a cybersecurity object. According to an embodiment, a disk portion, for example including a file, potentially includes a cybersecurity object based on the file location, a file type, a registry file, and the like. For example, in an embodiment, a disk portion including a file from a "sys/admin" folder is likely to contain a cybersecurity object, such as a stored password. In certain embodiments, it is beneficial to transfer only a portion of the inspectable disk which is predetermined to potentially include cybersecurity objects, as this conserves network bandwidth, memory, and storage, since disk portion which are unlikely to include cybersecurity objects are not transferred.

At S260, a check is performed to determine if inspection is complete. In certain embodiments, the check includes determining if each of a plurality of disks are inspected, each of a plurality of inspectable disks generated each based on a disk of the on-prem environment are inspected, and the like.

In some embodiments, an inspection is complete once the entire contents of an inspectable disk are read. In other embodiments, inspection of an inspectable disk is complete once a file system has been read, contents of the disk are determined, and an inspection of each content (e.g., a file) is performed.

In certain embodiments where inspection is not complete, a check is performed periodically to determine if inspection is complete. In some embodiments, an inspector is configured to signal, for example by writing to a flag, that inspection is complete. In some embodiments where inspection is not complete execution continues at S250. In an embodiment where inspection is complete, execution continues at S270.

At S270, a provisioned resource is released. In an embodiment, resources, such as block storage, are provisioned, allocated, and the like, to an inspectable disk. Once inspection of the inspectable disk is complete, such resources can be freed and otherwise utilized by the on-prem environment, according to an embodiment. In some embodiments, a check is performed periodically to determine if a storage resource, such as an addressable storage block, is allocated to an inspectable disk which is not being inspected (and therefore the allocation can be unallocated).

In certain embodiments, an addressable storage block is a data storage of a fixed size block of data, which is addressable by a unique address assigned to the storage block, thereby allowing to write up to a fixed size amount of data at the address of the addressable storage block.

Figure 3:
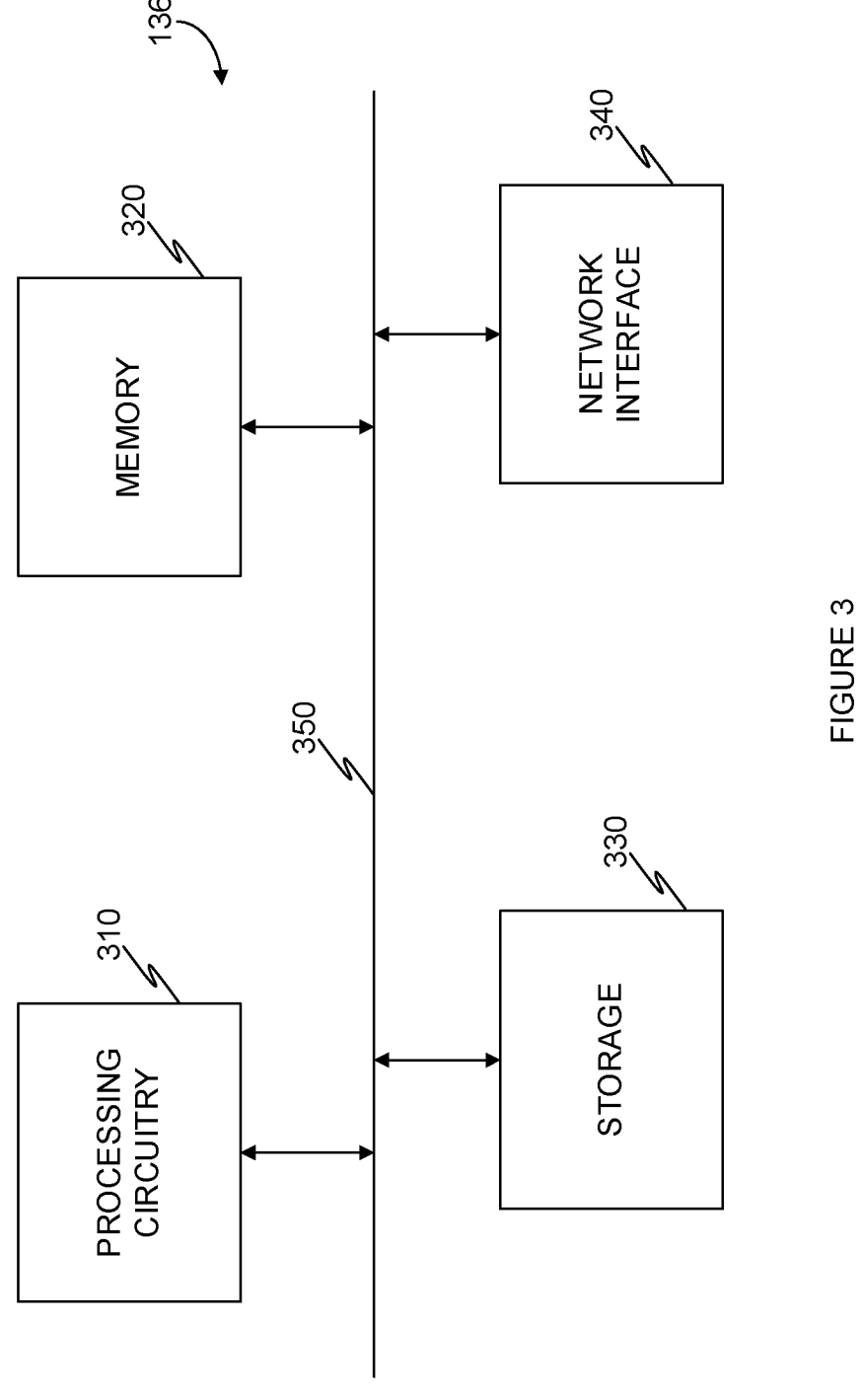
FIG. 3 is an example schematic diagram of an inspection controller according to an embodiment.

FIG. 3 is an example schematic diagram of an inspection controller 136 according to an embodiment. The inspection controller 136 includes a processing circuitry 310 coupled to a memory 320, a storage 330, and a network interface 340. In an embodiment, the components of the inspection controller 136 may be communicatively connected via a bus 350.

The processing circuitry 310 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 320 may be volatile (e.g., random access memory, etc.), non-volatile (e.g., read only memory, flash memory, etc.), or a combination thereof.

In one configuration, software for implementing one or more embodiments disclosed herein may be stored in the storage 330. In another configuration, the memory 320 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 310, cause the processing circuitry 310 to perform the various processes described herein.

The storage 330 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 340 allows the inspection controller 136 to communicate with, for example, the inspector 134, the on-prem environment 110, the graph database 132, and the like.

It should be understood that the embodiments described herein are not limited to the specific architecture illustrated in FIG. 3, and other architectures may be equally used without departing from the scope of the disclosed embodiments.

Furthermore, in certain embodiments, the inspector 134 may be implemented with the architecture illustrated in FIG. 3. In other embodiments, other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for inspecting a resource in an on-premises environment for a cybersecurity threat, comprising:
   initiating a network communication between the on-premises environment and an inspection environment in a cloud computing environment deployed on a cloud computing infrastructure;
   scanning the on-premises environment for a workload, the workload including a disk;
   generating an inspectable disk based on the disk;

providing access to an inspector deployed in the inspection environment to inspect the inspectable disk for a cybersecurity object;
   releasing a resource allocated to the inspectable disk in response to detecting that inspection of the inspectable disk is complete;
   transferring a portion of the inspectable disk to the inspection environment as a data stream; and
   determining that the portion of the inspectable disk potentially includes the cybersecurity object, wherein the determining further comprises:
      determining that the inspectable disk includes an operating system of a first type;
      detecting a file of a predetermined file type based on the operating system of the first type; and
      transferring the file of the predetermined file type as part of the portion of the inspectable disk.

2. The method of claim 1, further comprising:
transferring the inspectable disk to the inspection environment.

3. The method of claim 1, further comprising:
allocating a predetermined fixed bandwidth to the initiated network communication.

4. The method of claim 1, further comprising:
terminating the network communication in response to detecting that inspection of the inspectable disk is complete.

5. The method of claim 1, further comprising:
providing access for a principal of the on-premises environment to the inspectable disk, wherein the principal is configured to be assumed by the inspector.

6. The method of claim 1, further comprising:
mounting the inspectable disk in the on-premises environment.

7. The method of claim 1, wherein the inspection environment further includes a security graph that includes a representation of the on-premises environment.

8. The method of claim 1, further comprising:
listening on a predetermined port for a request to initiate a network link for the network communication; and
allocating a predetermined bandwidth for the network link.

9. The method of claim 8, further comprising:
allocating the predetermined bandwidth for a predefined window of time.

10. A non-transitory computer readable medium having stored thereon instructions for causing a processing circuitry to execute a process for inspecting a resource in an on-premises environment for a cybersecurity threat, the process comprising:
   initiating a network communication between the on-premises environment and an inspection environment in a cloud computing environment deployed on a cloud computing infrastructure;
   scanning the on-premises environment for a workload, the workload including a disk;
   generating an inspectable disk based on the disk;
   providing access to an inspector deployed in the inspection environment to inspect the inspectable disk for a cybersecurity object;
   releasing a resource allocated to the inspectable disk in response to detecting that inspection of the inspectable disk is complete;
   transferring a portion of the inspectable disk to the inspection environment as a data stream; and determining that the portion of the inspectable disk potentially includes the cybersecurity object, wherein the determining further comprises:

determining that the inspectable disk includes an operating system of a first type;

detecting a file of a predetermined file type based on the operating system of the first type; and transferring the file of the predetermined file type as part of the portion of the inspectable disk.

11. A system for inspecting a resource in an on-premises environment for a cybersecurity threat, comprising:

a processing circuitry; and a memory, the memory containing instructions that, when executed by the processing circuitry, configure the system to:

initiate a network communication between the on-premises environment and an inspection environment in a cloud computing environment deployed on a cloud computing infrastructure;

scan the on-premises environment for a workload, the workload including a disk;

generate an inspectable disk based on the disk;

provide access to an inspector deployed in the inspection environment to inspect the inspectable disk for a cybersecurity object; and release a resource allocated to the inspectable disk in response to detecting that inspection of the inspectable disk is complete;

transfer a portion of the inspectable disk to the inspection environment as a data stream; and make a determination that the portion of the inspectable disk potentially includes the cybersecurity object, wherein the processing circuitry further configures the system to make the determination by:

determining that the inspectable disk includes an operating system of a first type;

detecting a file of a predetermined file type based on the operating system of the first type; and transferring the file of the predetermined file type as part of the portion of the inspectable disk.

12. The system of claim 11, wherein the memory includes further instructions which when executed by the processing circuitry further configure the system to:

transfer the inspectable disk to the inspection environment.

13. The system of claim 11, wherein the memory includes further instructions which when executed by the processing circuitry further configure the system to:

allocate a predetermined fixed bandwidth to the initiated network communication.

14. The system of claim 11, wherein the memory includes further instructions which when executed by the processing circuitry further configure the system to:

terminate the network communication in response to detecting that inspection of the inspectable disk is complete.

15. The system of claim 11, wherein the memory includes further instructions which when executed by the processing circuitry further configure the system to:

provide access for a principal of the on-premises environment to the inspectable disk, wherein the principal is configured to be assumed by the inspector.

16. The system of claim 11, wherein the memory includes further instructions which when executed by the processing circuitry further configure the system to:

mount the inspectable disk in the on-premises environment.

17. The system of claim 11, wherein the inspection environment further includes a security graph that includes a representation of the on-premises environment.

18. The system of claim 11, further comprising:

listening on a predetermined port for a request to initiate a network link for the network communication; and allocating a predetermined bandwidth for the network link.

19. The system of claim 18, further comprising:

allocating the predetermined bandwidth for a predefined window of time.

* * * * *